(12) United States Patent
Lin et al.

(10) Patent No.: US 10,992,402 B2
(45) Date of Patent: Apr. 27, 2021

(54) CLOCK SYNCHRONIZATION OVER A WIRELESS CONNECTION

(71) Applicant: QUALCOMM Incorporated, San Diego, CA (US)

(72) Inventors: Yih-Hao Lin, San Diego, CA (US); Peerapol Tinnakornsrisuphap, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/598,932

(22) Filed: Oct. 10, 2019

(65) Prior Publication Data

US 2020/0119825 A1 Apr. 16, 2020

Related U.S. Application Data

(60) Provisional application No. 62/744,920, filed on Oct. 12, 2018.

(51) Int. Cl.
| | |
|---|---|
| *H04J 3/06* | (2006.01) |
| *H04W 76/25* | (2018.01) |
| *H04W 76/27* | (2018.01) |
| *H04W 56/00* | (2009.01) |
| *H04W 72/04* | (2009.01) |

(52) U.S. Cl.
CPC ............ *H04J 3/0667* (2013.01); *H04J 3/067* (2013.01); *H04W 56/001* (2013.01); *H04W 72/0446* (2013.01); *H04W 76/25* (2018.02); *H04W 76/27* (2018.02)

(58) Field of Classification Search
None
See application file for complete search history.

(56) References Cited

U.S. PATENT DOCUMENTS

| | | | |
|---|---|---|---|
| 10,257,798 B1* | 4/2019 | Koelemeij | .......... H04W 56/006 |
| 2007/0121550 A1 | 5/2007 | Wada | |
| 2017/0359137 A1* | 12/2017 | Butterworth | .......... H04J 3/0661 |

FOREIGN PATENT DOCUMENTS

| | | |
|---|---|---|
| EP | 1724960 A1 | 11/2006 |
| EP | 2663141 A1 | 11/2013 |

OTHER PUBLICATIONS

International Search Report and Written Opinion—PCT/US2019/055837—ISA/EPO—dated Jan. 14, 2020.

* cited by examiner

*Primary Examiner* — Christine T Duong
(74) *Attorney, Agent, or Firm* — Patterson & Sheridan, LLP

(57) ABSTRACT

Techniques for clock synchronization over a wireless connection are provided. A first wireless node determines an offset between a first clock used by the first wireless node for a wired connection between the first wireless node and at least one upstream node and a second clock used by the first wireless node for a wireless connection between the first wireless node and a second wireless node on the downstream. The first wireless node transmits an indication of the determined offset to the second wireless node for use by the second wireless node to calibrate a third clock corresponding to the first clock to synchronize the third clock with the first clock, wherein the third clock is used by the second wireless node for a second wired connection with at least one downstream node.

38 Claims, 12 Drawing Sheets

$\Delta f, \theta$ : offsets between CLK_PTP_NB and CLK_NR_NB

CLK_NR_UE $\sim=$ CLK_NR_NB

CLOCK SYNCHRONIZATION OVER A WIRELESS CONNECTION

CROSS-REFERENCE TO RELATED APPLICATION(S)

This application claims priority to U.S. Provisional Application No. 62/744,920, entitled "CLOCK SYNCHRONIZATION OVER A WIRELESS CONNECTION", filed on Oct. 12, 2018, which is expressly incorporated by reference herein in its entirety.

FIELD OF THE DISCLOSURE

Aspects of the present disclosure relate to wireless communications, and more particularly, to techniques for clock synchronization over a wireless connection.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or $5^{th}$ Generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for clock synchronization over a wireless connection.

Certain aspects provide a method for wireless communication by a first wireless node. The method generally includes determining at least one offset, associated with at least one parameter, between each of at least one first clock used by the first wireless node for a first wired connection between the first wireless node and at least one upstream node and a second clock used by the first wireless node for a wireless connection between the first wireless node and a second wireless node on the downstream; and transmitting an indication of the determined at least one offset to the second wireless node for use by the second wireless node to calibrate at least one third clock corresponding to the at least one first clock to synchronize the at least one third clock with the at least one first clock, wherein the at least one third clock is used by the second wireless node for a second wired connection with at least one downstream node.

In an aspect, the second clock is synchronized with a fourth clock of the second wireless node, wherein the fourth clock is used for the wireless connection between the first wireless node and the second wireless node.

In an aspect, the at least one parameter comprises at least one of frequency or phase.

In an aspect, the at least one parameter comprises frequency and phase, and wherein determining the at least one offset comprises measuring a frequency offset and a phase offset between each of the at least one first clock and the second clock.

In an aspect, transmitting the indication of the determined at least one offset comprises transmitting the measured frequency offset and the measured phase offset corresponding to each of the at least one first clock.

In an aspect, the transmitting comprises transmitting the measured frequency offset and the measured phase offset corresponding to each of the at least one first clock in a same message.

In an aspect, the transmitting the indication comprises transmitting the determined at least one offset via at least one of a Radio Resource Control (RRC) message or a Non-Access Stratum (NAS) message.

In an aspect, the at least one parameter comprises frequency, and wherein determining the at least one offset comprises measuring a frequency offset between each of the at least one first clock and the second clock.

In an aspect, transmitting the indication of the determined at least one offset comprises, for each of the at least first clock: periodically transmitting a message to the second wireless node; and transmitting a time stamp associated with each periodically transmitted instance of the message, wherein the time stamp indicates a time at which the message was generated according to the at least one first clock.

In an aspect, the time stamp is associated with a defined reference time instance in the message.

In an aspect, the defined reference time instance comprises an end of at least one of a frame, a slot or a mini-slot of a current or previous transmitted instance of the message.

In an aspect, the message comprises at least one of a System Information Block (SIB) message, another Radio Resource Control (RRC) message or a Non-Access Stratum (NAS) message.

In an aspect, the first wired connection and the second wired connection use a point to point (PTP) protocol.

In an aspect, the wireless connection uses $5^{th}$ Generation (5G) New Radio (NR).

Certain aspects provide a method for wireless communication by a first wireless node. The method generally includes receiving an indication of at least one offset from a second wireless node on the upstream, the at least one offset, associated with at least one parameter, is between each of at least one first clock used by the second wireless node for a first wired connection between the second wireless node and at least one upstream node and a second clock used by the second wireless node for a wireless connection between the second wireless node and the first wireless node; and calibrating at least one third clock corresponding to the at least one first clock, based on the received indication, to synchronize the at least one third clock with the at least one first clock, wherein the at least one third clock is used by the first wireless node for a second wired connection with at least one downstream node.

In an aspect, the second clock is synchronized with a fourth clock of the first wireless node, wherein the fourth clock is used for the wireless connection between the first wireless node and the second wireless node.

In an aspect, the at least one parameter comprises at least one of frequency or phase.

In an aspect, the at least one parameter comprises frequency and phase, and wherein receiving the indication of the at least one offset comprises receiving a frequency offset and a phase offset between each of the at least one first clock and the second clock.

In an aspect, receiving the indication of the at least one offset comprises receiving the frequency offset and the phase offset in a same message.

In an aspect, calibrating the at least one third clock comprises calibrating each of the at least one third clock based on the received frequency offset and the phase offset associated with a corresponding one of the at least one first clock.

In an aspect, receiving the indication comprises receiving the at least one offset via at least one of a Radio Resource Control (RRC) message or a Non-Access Stratum (NAS) message.

In an aspect, the at least one parameter comprises frequency, and wherein receiving the indication of the at least one offset comprises receiving a frequency offset between each of the at least one first clock and the second clock.

In an aspect, receiving the indication of the at least one offset comprises, for each of the at least first clock: periodically receiving a message from the second wireless node; and receiving a time stamp associated with each periodically received instance of the message, wherein the time stamp indicates a time at which the message was generated at the second wireless node according to the at least one first clock.

In an aspect, calibrating the at least one third clock comprises, for each corresponding one of the at least one third clock: determining a first duration between two successively received messages based on a fourth clock of the first wireless node, wherein the fourth clock is used for the wireless connection between the first wireless node and the second wireless node; determining a second duration between time stamps of two successively received messages; and determining a frequency offset between the fourth clock and the third clock based on the first and second durations.

In an aspect, the time stamp is associated with a defined reference time instance in the message.

In an aspect, the defined reference time instance comprises an end of at least one of a frame, a slot or a mini-slot of a current or previous received instance of the message.

In an aspect, the first wired connection and the second wired connection use a point to point (PTP) protocol.

In an aspect, the wireless connection uses $5^{th}$ Generation (5G) New Radio (NR).

Certain aspects of the present disclosure provide a first wireless node. The first wireless node generally includes at least one processor and a memory coupled to the at least one processor. The at least one processor is generally configured to determine at least one offset, associated with at least one parameter, between each of at least one first clock used by the first wireless node for a first wired connection between the first wireless node and at least one upstream node and a second clock used by the first wireless node for a wireless connection between the first wireless node and a second wireless node on the downstream; and transmit an indication of the determined at least one offset to the second wireless node for use by the second wireless node to calibrate at least one third clock corresponding to the at least one first clock to synchronize the at least one third clock with the at least one first clock, wherein the at least one third clock is used by the second wireless node for a second wired connection with at least one downstream node.

Certain aspects of the present disclosure provide a first wireless node. The first wireless node generally includes at least one processor and a memory coupled to the at least one processor. The at least one processor is generally configured to receive an indication of at least one offset from a second wireless node on the upstream, the at least one offset, associated with at least one parameter, is between each of at least one first clock used by the second wireless node for a first wired connection between the second wireless node and at least one upstream node and a second clock used by the second wireless node for a wireless connection between the second wireless node and the first wireless node; and calibrate at least one third clock corresponding to the at least one first clock, based on the received indication, to synchronize the at least one third clock with the at least one first clock, wherein the at least one third clock is used by the first wireless node for a second wired connection with at least one downstream node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
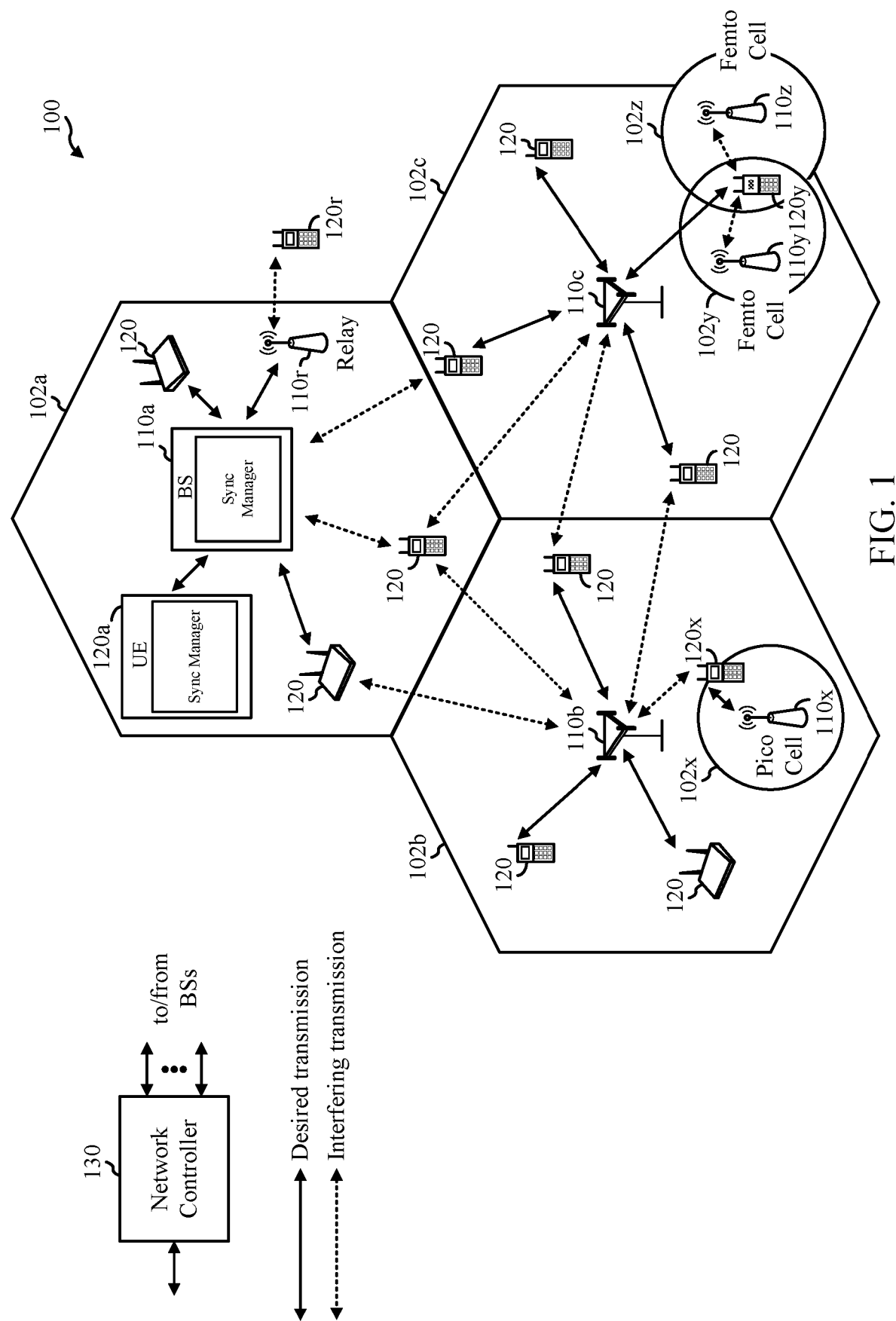
FIG. 1 is a block diagram conceptually illustrating an example telecommunications system, in accordance with certain aspects of the present disclosure.

Currently most industrial networks are based on wireline systems including wired connections between industrial components. However, with the advent of industrial 4.0, the desire for a highly configurable factory is continuously driving the development of 5G for replacement of wireline systems in the factory with 5G wireless systems, as wired connections are not ideal for a highly configurable factory. However, the 5G wireline replacement systems may need to provide backward compatibility to the wireline network in order to support legacy machines and other equipment. One challenge in designing a wireline replacement system using 5G comes from industrial applications that require highly synchronized coordination between machines and their control components. Currently, those synchronized functions are realized via industrial Ethernet with standard synchronization protocols, for example, IEEE 1588v2 or Point to Point, PTP which offers sub 1 micro second level of synchronization accuracy. To support the legacy machines and equipment, a solution for those standard synchronization protocols over 5G is needed. Thus, the 5G wireline replacement system may need to support the current PTP timing and synchronization protocols and satisfy the stringent timing and synchronization requirements of a wireline PTP network.

Standard PTP protocols rely heavily on accurate hardware timestamping and the nature of coherence and symmetry in wireline propagation and processing delay. However, wireless communication networks are infamous for their random dynamics in channel condition and queuing delay, which make the conventional synchronization protocols designed for wireline systems to perform poorly when directly applied to wireless systems.

Aspects of the present disclosure discuss techniques for maintaining wireline equivalent clock synchronization accuracy over a wireless network (e.g., 5G NR network) using standard wireline protocols. In certain aspects, using the techniques discussed herein, PTP clocks (e.g., clocks synchronized based on PTP wireline protocols) at either end of a wireless connection (e.g., a 5G NR wireless connection) wirelessly connecting two nodes having PTP clock instances may be synchronized over the wireless connection by sharing offsets, between the nodes, of local NR clocks at the nodes with respect to corresponding PTP clocks at the nodes. In an aspect, the offsets may include a frequency offset and/or a phase offset between a local NR clock at a node and a corresponding PTP clock at the node.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs) 120. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

According to certain aspects, the BSs 110 and UEs 120 may be configured for clock synchronization over a wireless connection. As shown in FIG. 1, the BS 110a includes a sync manager 112 and the UE 120a includes a sync manager 122. The sync managers 112 and/or 122 may be configured for determining at least one offset, associated with at least one parameter, between each of at least one first clock used by the first wireless node for a first wired connection between the first wireless node and at least one upstream node and a second clock used by the first wireless node for a wireless connection between the first wireless node and a second wireless node on the downstream; and transmitting an indication of the determined at least one offset to the second wireless node for use by the second wireless node to calibrate at least one third clock corresponding to the at least one first clock to synchronize the at least one third clock with the at least one first clock, wherein the at least one third clock is used by the second wireless node for a second wired connection with at least one downstream node, in accordance with aspects of the present disclosure described herein.

The sync managers 112 and/or 122 may further be configured for receiving an indication of at least one offset from a second wireless node on the upstream, the at least one offset, associated with at least one parameter, is between each of at least one first clock used by the second wireless node for a first wired connection between the second wireless node and at least one upstream node and a second clock used by the second wireless node for a wireless connection between the second wireless node and the first wireless node; and calibrating at least one third clock corresponding to the at least one first clock, based on the received indication, to synchronize the at least one third clock with the at least one first clock, wherein the at least one third clock is used by the first wireless node for a second wired connection with at least one downstream node, in accordance with aspects of the present disclosure described herein.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network.

In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
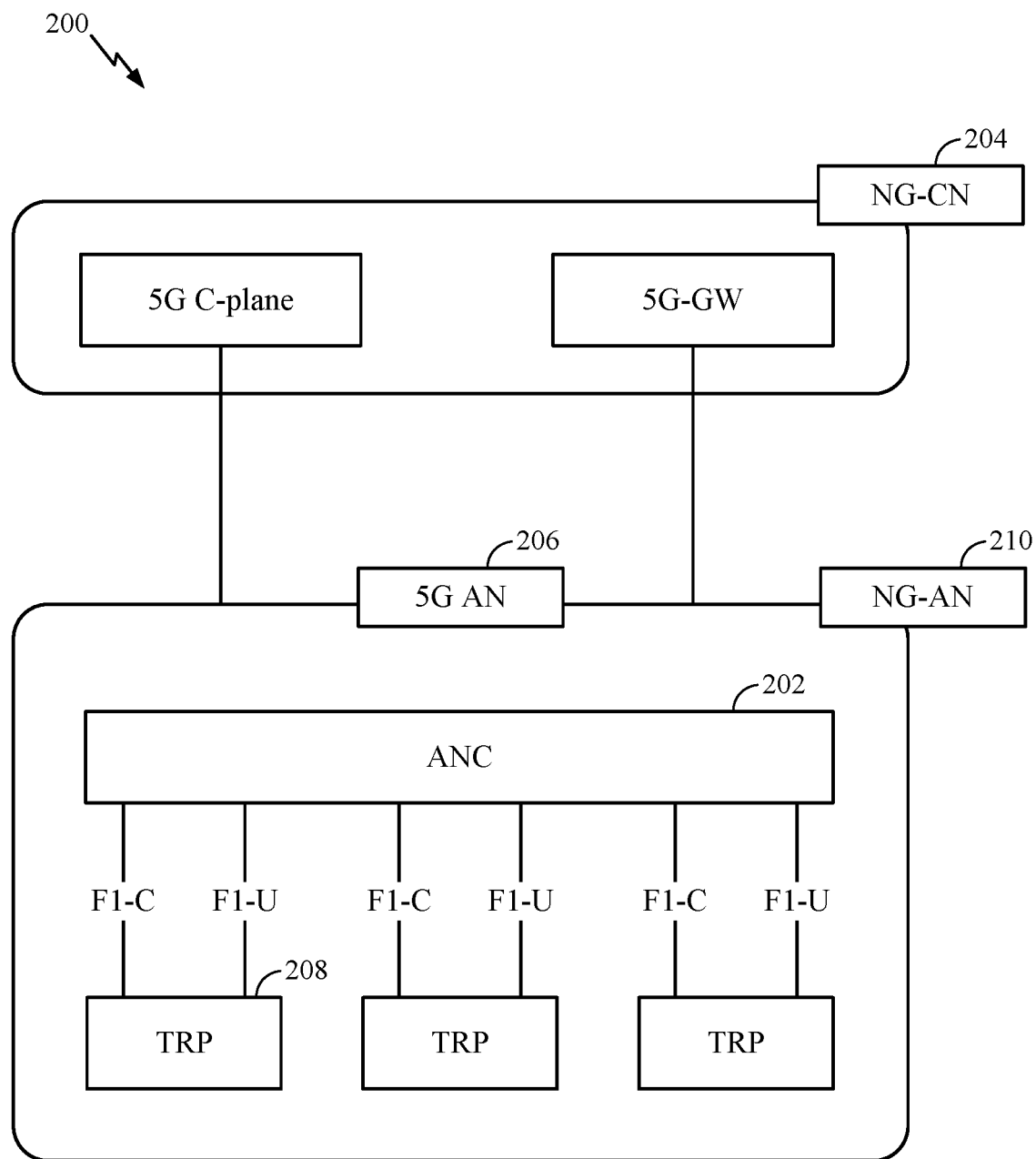
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
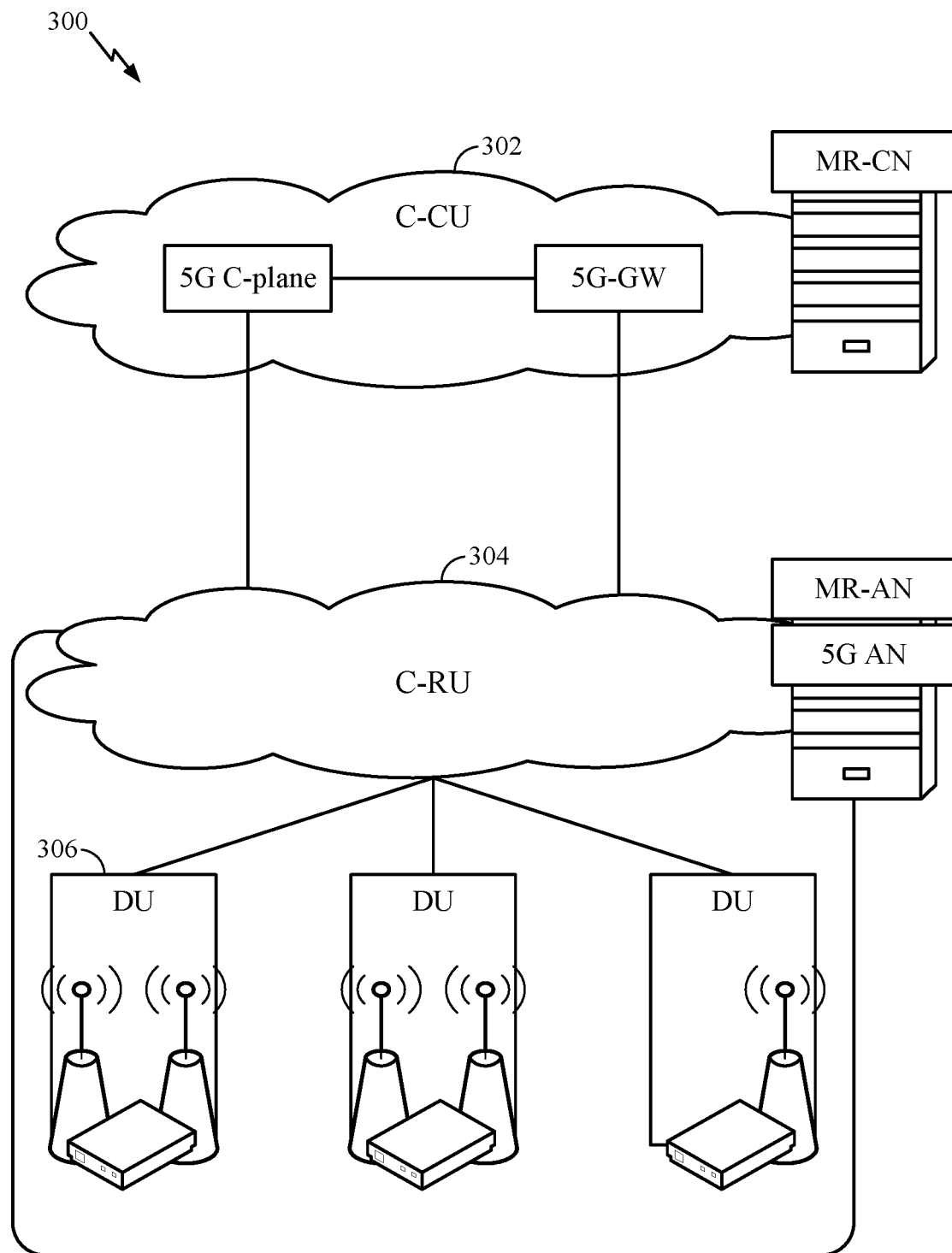
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
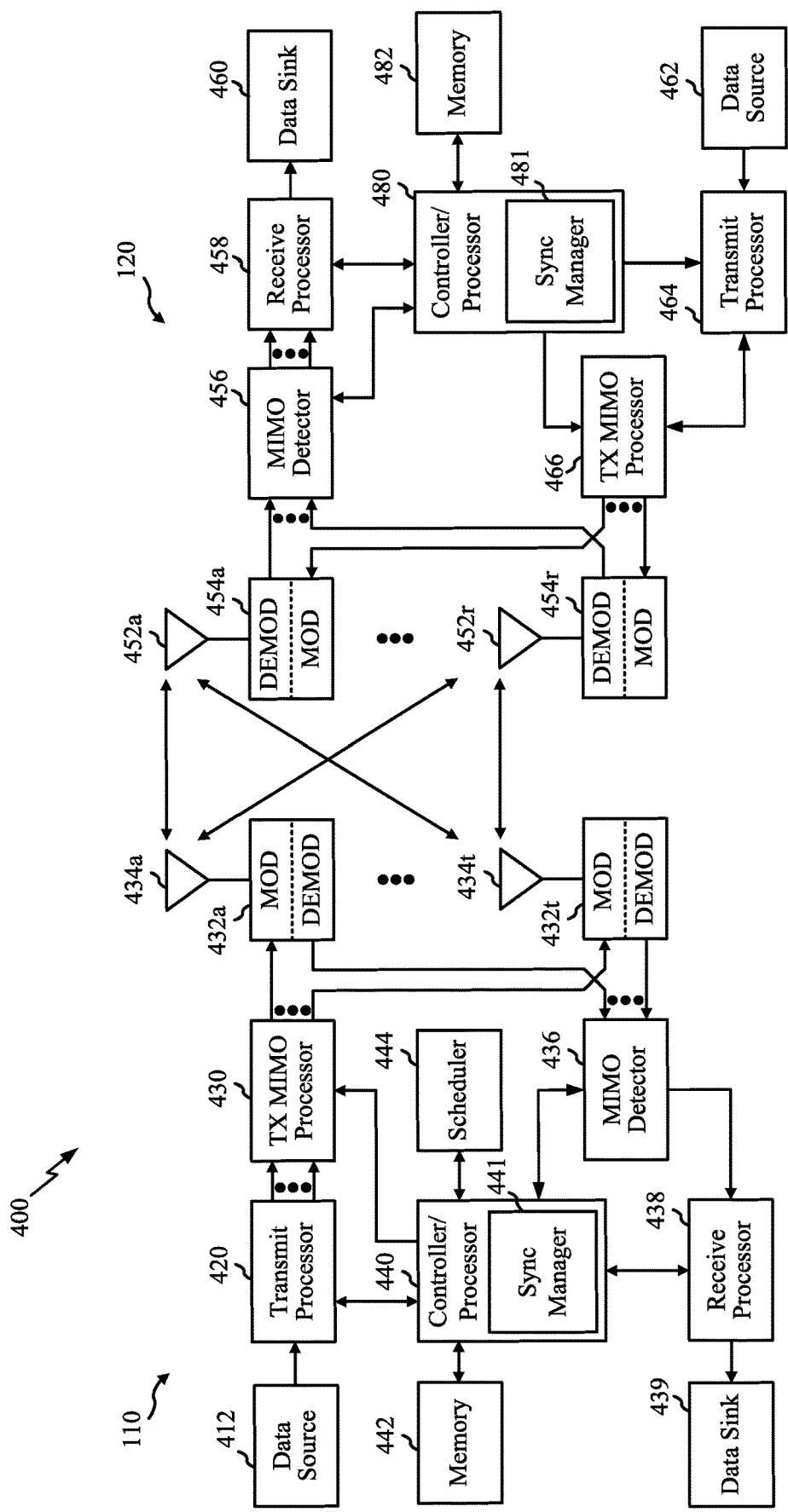
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

As shown in FIG. 4, the controller/processor 480 of the UE 120 has a sync manager 481 and the controller/processor 440 of the BS 110 has a sync manager 441. The sync managers 441 and 481 may be configured for clock synchronization over a wireless connection. In an aspect, the sync managers 441 and/or 481 may be configured for determining at least one offset, associated with at least one parameter, between each of at least one first clock used by the first wireless node for a first wired connection between the first wireless node and at least one upstream node and a second clock used by the first wireless node for a wireless connection between the first wireless node and a second wireless node on the downstream; and transmitting an indication of the determined at least one offset to the second wireless node for use by the second wireless node to calibrate at least one third clock corresponding to the at least one first clock to synchronize the at least one third clock with the at least one first clock, wherein the at least one third clock is used by the second wireless node for a second wired connection with at least one downstream node, in accordance with aspects of the present disclosure described herein.

The sync managers 441 and/or 481 may further be configured for receiving an indication of at least one offset from a second wireless node on the upstream, the at least one offset, associated with at least one parameter, is between each of at least one first clock used by the second wireless node for a first wired connection between the second wireless node and at least one upstream node and a second clock used by the second wireless node for a wireless connection between the second wireless node and the first wireless node; and calibrating at least one third clock corresponding to the at least one first clock, based on the received indication, to synchronize the at least one third clock with the at least one first clock, wherein the at least one third clock is used by the first wireless node for a second wired connection with at least one downstream node, in accordance with aspects of the present disclosure described herein.

Figure 5:
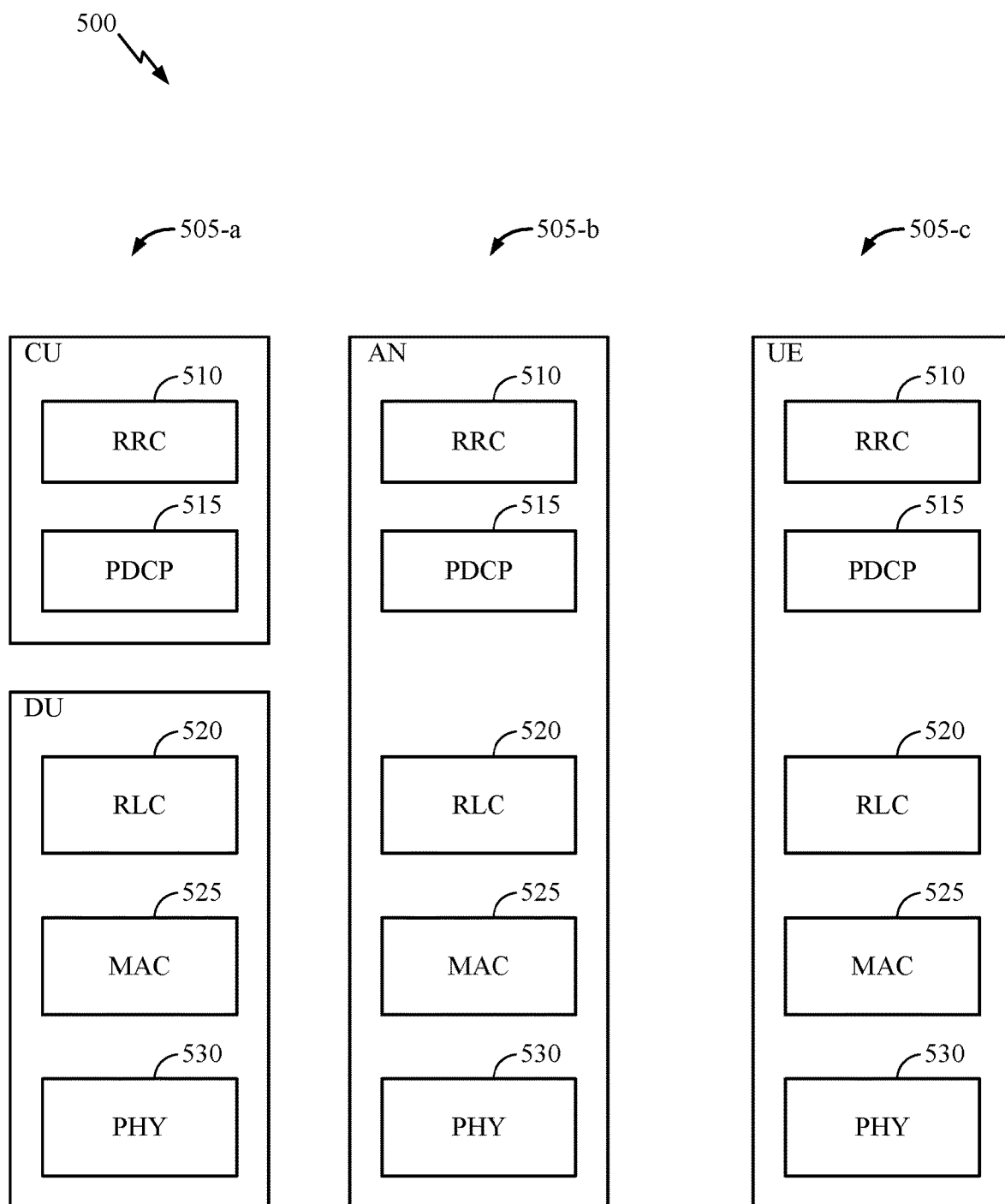
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
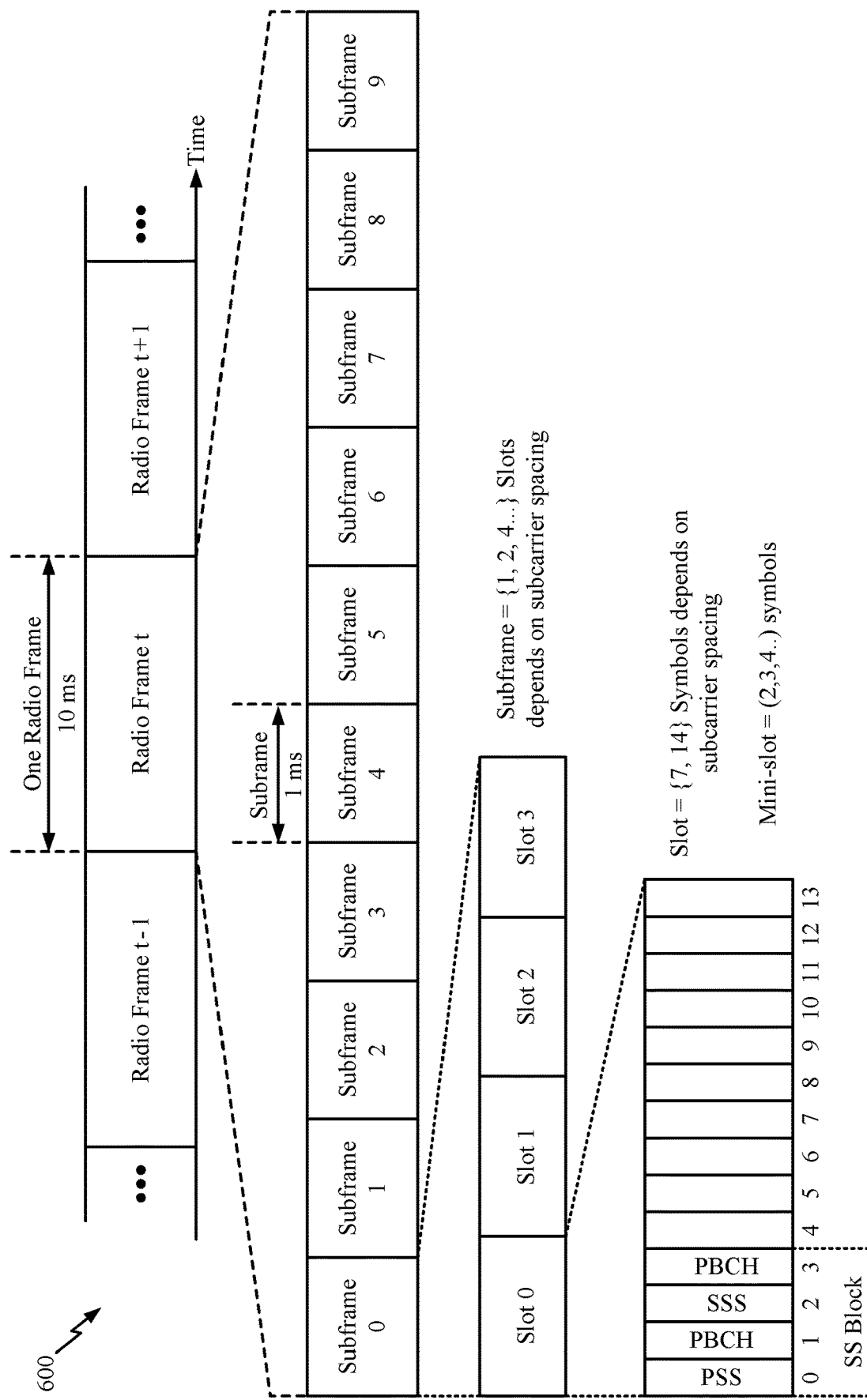
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Clock Synchronization Over a 5G NR Connection

Currently most industrial networks are based on wireline systems including wired connections between industrial components. However, with the advent of industrial 4.0, the desire for a highly configurable factory is continuously driving the development of 5G for replacement of wireline systems in the factory with 5G wireless systems, as wired connections are not ideal for a highly configurable factory. However, the 5G wireline replacement systems may need to provide backward compatibility to the wireline network in order to support legacy machines and other equipment. One challenge in designing a wireline replacement system using 5G comes from industrial applications that require highly synchronized coordination between machines and their control components. Currently, those synchronized functions are realized via industrial Ethernet with standard synchronization protocols, for example, IEEE 1588v2 or Point to Point, PTP which offers sub 1 micro second level of synchronization accuracy. To support the legacy machines and equipment, a solution for those standard synchronization protocols over 5G is needed. Thus, the 5G wireline replacement system may need to support the current PTP timing and synchronization protocols and satisfy the stringent timing and synchronization requirements of a wireline PTP network.

Standard PTP protocols rely heavily on accurate hardware timestamping and the nature of coherence and symmetry in wireline propagation and processing delay. However, wireless communication networks are infamous for their random dynamics in channel condition and queuing delay, which make the conventional synchronization protocols designed for wireline systems to perform poorly when directly applied to wireless systems.

Aspects of the present disclosure provide techniques for maintaining wireline equivalent clock synchronization accuracy over a wireless network (e.g., 5G NR network) using standard wireline protocols. In certain aspects, using the techniques discussed herein, PTP clocks (e.g., clocks synchronized based on PTP wireline protocols) at either end of a wireless connection (e.g., a 5G NR wireless connection) wirelessly connecting two nodes having PTP clock instances may be synchronized over the wireless connection by sharing offsets, between the nodes, of local NR clocks at the nodes with respect to corresponding PTP clocks at the nodes. In an aspect, the offsets may include a frequency offset and/or a phase offset between a local NR clock at a node and a corresponding PTP clock at the node.

Figure 7:
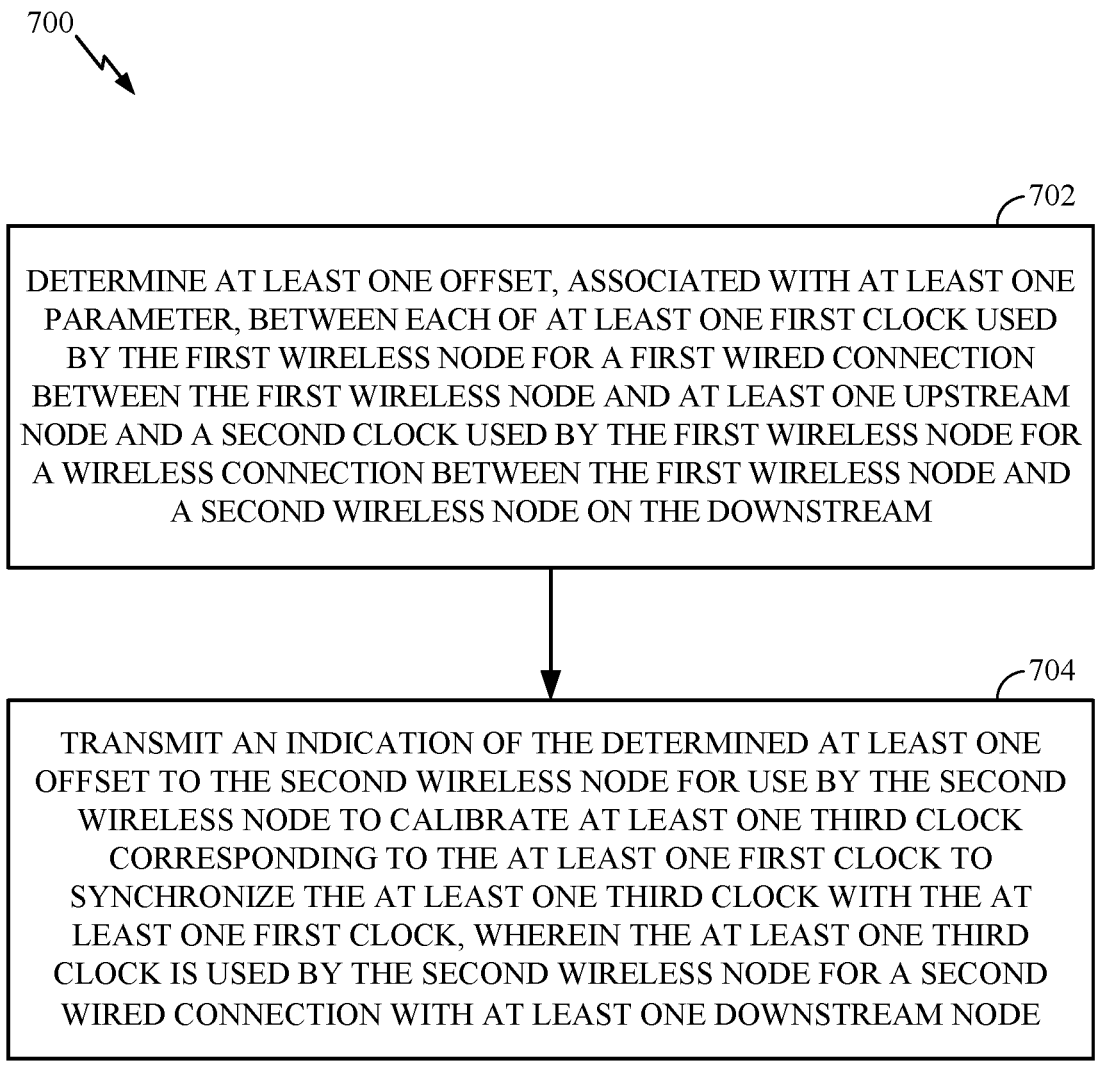
FIG. 7 illustrates example operations performed by a first wireless node (e.g., gNB, UE etc.) for synchronizing PTP clocks over a wireless connection, in accordance with certain aspects of the present disclosure.

FIG. 7 illustrates example operations 700 performed by a first wireless node (e.g., gNB, UE etc.) for synchronizing PTP clocks over a wireless connection, in accordance with certain aspects of the present disclosure. In an aspect, operations 700 may be performed by any wireless node transmitting packets to a wireless receiving node.

Operations 700 begin, at 702, by determining at least one offset, associated with at least one parameter, between each of at least one first clock used by the first wireless node for a first wired connection between the first wireless node and at least one upstream node and a second clock used by the first wireless node for a wireless connection between the first wireless node and a second wireless node on the downstream. In an aspect, the second wireless node may be a gNB or a UE. In an aspect, the first wireless node is a gNB and the second wireless node is a UE served by the gNB. In alternative aspects, the first wireless node is a UE and the second wireless node is a gNB serving the UE.

At 704, the first wireless node transmits an indication of the determined at least one offset to the second wireless node for use by the second wireless node to calibrate at least one third clock corresponding to the at least one first clock to synchronize the at least one third clock with the at least one first clock, wherein the at least one third clock is used by the second wireless node for a second wired connection with at least one downstream node. In an aspect, the second clock is synchronized with a fourth clock of the second wireless node, wherein the fourth clock is used for the wireless connection between the first wireless node and the second wireless node.

In an aspect, the at least one first clock is a PTP clock and the second clock is a NR clock at the first wireless node, and the at least one third clock is a PTP clock and the fourth clock is a NR clock at the second wireless node. In an aspect, the at least one first clock includes multiple PTP clock instances, wherein each PTP clock instance is synchronized with a different upstream PTP clock over a corresponding wired connection. In an aspect, the at least one third clock includes multiple PTP clock instances, wherein each PTP clock instance is synchronized with a different downstream PTP clock over a corresponding wired connection. In an aspect, each PTP clock instance at the second wireless node synchronizes with a corresponding PTP clock instance at the first wireless node. The NR clocks at the first and the second wireless nodes synchronize over the wireless connection. In an aspect, the corresponding PTP clocks at the first and second nodes synchronize over the wireless connection based on the NR clocks and the at least one offset between the NR clock and the PTP clocks at each wireless node.

In certain aspects, the at least one parameter may include a frequency offset and/or a phase offset. In an aspect, the at least one parameter may include a time offset.

Figure 8:
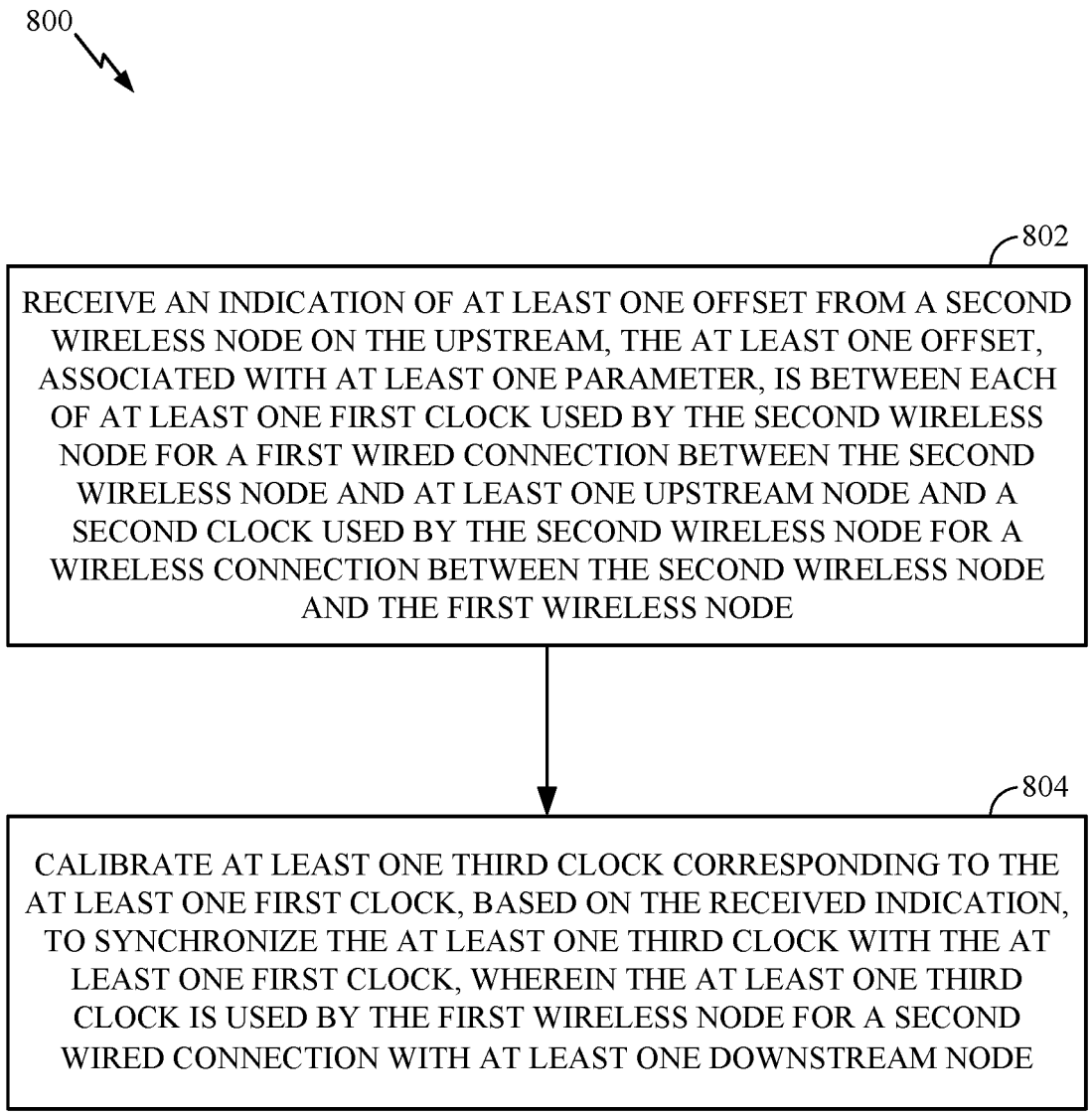
FIG. 8 illustrates example operations performed by a first wireless node (e.g., gNB, UE etc.) for synchronizing PTP clocks over a wireless connection, in accordance with certain aspects of the present disclosure.

FIG. 8 illustrates example operations 800 performed by a first wireless node (e.g., gNB, UE etc.) for synchronizing PTP clocks over a wireless connection, in accordance with certain aspects of the present disclosure. In an aspect, operations 800 may be performed by any wireless node receiving packets from another wireless transmitting node.

Operations 800 begin, at 802, by receiving an indication of at least one offset from a second wireless node on the upstream, the at least one offset, associated with at least one parameter, is between each of at least one first clock used by the second wireless node for a first wired connection between the second wireless node and at least one upstream node and a second clock used by the second wireless node for a wireless connection between the second wireless node and the first wireless node. In an aspect, the first wireless node is a UE and the second wireless node is a gNB serving the UE. In alternative aspects, the first wireless node is a gNB and the second wireless node is a UE served by the gNB.

At 804, the first wireless node calibrates at least one third clock corresponding to the at least one first clock, based on the received indication, to synchronize the at least one third clock with the at least one first clock, wherein the at least one third clock is used by the first wireless node for a second wired connection with at least one downstream node. In an aspect, the second clock is synchronized with a fourth clock of the first wireless node, wherein the fourth clock is used for the wireless connection between the first wireless node and the second wireless node.

In an aspect, the at least one first clock is a PTP clock and the second clock is a NR clock at the second wireless node, and the at least one third clock is a PTP clock and the fourth clock is a NR clock at the first wireless node. In an aspect, the at least one first clock includes multiple PTP clock instances, wherein each PTP clock instance is synchronized with a different upstream PTP clock over a corresponding wired connection. In an aspect, the at least one third clock includes multiple PTP clock instances, wherein each PTP clock instance is synchronized with a different downstream PTP clock over a corresponding wired connection. In an aspect, each PTP clock instance at the first wireless node synchronizes with a corresponding PTP clock instance at the second wireless node. The NR clocks at the first and the second wireless nodes synchronize over the wireless connection. In an aspect, the corresponding PTP clocks at the first and second nodes synchronize over the wireless connection based on the NR clocks and the at least one offset between the NR clock and the PTP clocks at each wireless node.

In certain aspects, the at least one parameter may include a frequency offset and/or a phase offset.

Figure 9:
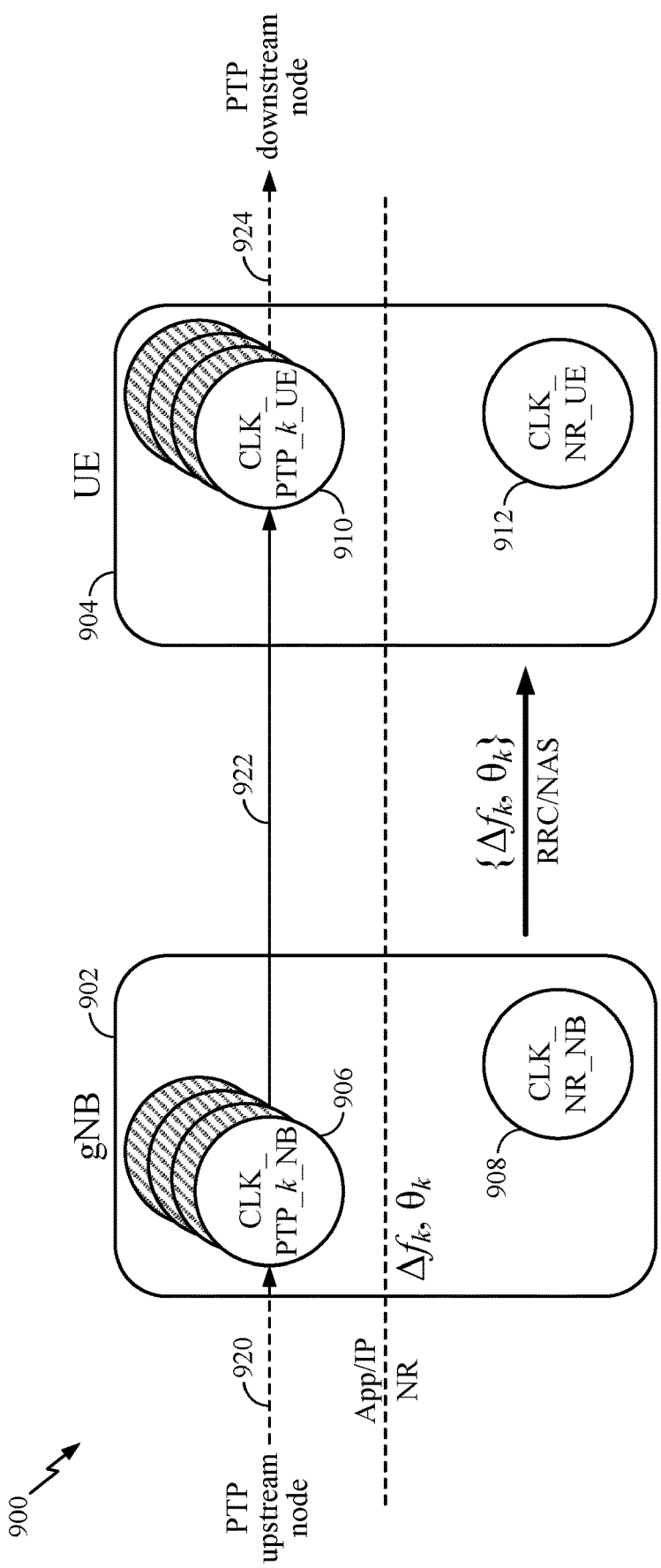
FIG. 9 illustrates an example of PTP clock synchronization over a 5G NR wireless connection, in accordance with certain aspects of the present disclosure.

FIG. 9 illustrates an example 900 of PTP clock synchronization over a 5G NR wireless connection, in accordance with certain aspects of the present disclosure. As shown, gNB 902 serves UE 904 over a wireless connection 922 (e.g., 5G NR connection). The gNB 902 is connected to one or more PTP upstream nodes over respective wired connections 920 to the respective PTP upstream nodes. The UE 904 is connected to one or more PTP downstream nodes over respective wired connections 924 to the respective PTP downstream nodes. In certain aspects, the wireless portion including the gNB 902 and the UE 904 connected by the wireless connection 922 may represent an extension of an existing wireline network or may be an intermediate connection in a chain of PTP nodes. In an aspect, the gNB 902 receives packets from one or more PTP upstream nodes over respective wired connections 920 with the PTP upstream nodes. The gNB 902 transmits packets (e.g., based on processing the received packets or merely forwards the received packets) to the UE over the wireless connection 922. The UE transmits packets (e.g., based on processing the received packets or merely forwards the received packets) to one or more PTP downstream nodes over respective wired connections 924 to the PTP downstream nodes.

In certain aspects, both the gNB 902 and UE 904 are also PTP nodes. As shown, the gNB 902 may include multiple PTP clocks 906, wherein each PTP clock instance 906 (shown as CLK_PTP_k_NB) synchronizes with a different PTP upstream node. In an aspect, k represents an index of the PTP clock instance 906. Similarly, the UE 904 includes multiple PTP clocks 910, wherein each PTP clock instance 910 (shown as CLK_PTP_k_UE) synchronizes with a different PTP downstream node. In an aspect, k represents an index of the PTP clock instance 910 corresponding to a PTP clock instance 906 with the same index k. In certain aspects, each PTP clock instance 910 at the UE needs to synchronize with a corresponding PTP clock instance 906 at the gNB 902. Since, the PTP clocks 906 and 910 are used for communication using the PTP protocol, they need to maintain synchronization accuracy in accordance with the PTP protocol. The gNB 902 additionally includes a NR clock 908 (shown as CLK_NR_NB) which synchronizes with a corresponding NR clock 912 CLK_NR_NB at the UE.

Generally, a PTP clock of a downstream PTP node is synchronized with a corresponding PTP clock of an upstream PTP node using time stamps associated with packets exchanged between the two PTP nodes. A time stamp is generally generated at the physical layer of the upstream PTP node when transmitting a packet to the downstream PTP node and includes information regarding when the packet was sent out by the transmitting PTP node. A time stamp is either appended to the packet it relates to or is transmitted in a message following the packet.

In certain aspects, since the gNB 902 and UE 904 are connected only via the wireless connection 922, the PTP clocks 906 and 910 need to be synchronized over the wireless connection 922 using the NR clocks 908 and 912 as the NR clocks are synchronized.

In certain aspects, NR clocks are generally tightly synchronized between a gNB and its served UE, for example, with sub 1 micro second accuracy. Thus, it may be assumed that the NR clocks 908 and 912 are tightly synchronized. In certain aspects, the PTP clocks 906 and 910 may be synchronized over the wireless connection 922 using the NR clocks 908 and 912 as the NR clocks are synchronized. Accordingly, in certain aspects, assuming that the NR clocks 908 and 912 are tightly synchronized, if the UE knows an offset (e.g., frequency offset and/or phase offset) of the NR clock 908 with respect to a PTP clock 906 at the gNB 902, the UE may synchronize a corresponding PTP clock 910 at the UE 904 based on the UE's NR clock 912.

In certain aspects of the present disclosure, both frequency and phase of PTP clocks may be synchronized over a wireless connection, based on frequency and phase offsets respectively between an NR clock and each PTP clock at a transmitting wireless node.

For example, the gNB 902 measures a frequency offset ($\Delta f_k$) and a phase offset ($\theta_k$) between each kth PTP clock 906 (CLK_PTP_k_NB) and the NR clock 908 (CLK_NR_NB) for k=1, 2, . . . , N, where N is the total number of PTP clock instances 906. In an aspect, since the gNB is also a PTP node, it has access to the PTP clock instances 906 and may measure the $\Delta f_k$ and $\theta_k$ without much effort.

The gNB 902 transmits to the UE 904 the measured $\Delta f_k$ and $\theta_k$ for each PTP clock instance k 906 over the wireless connection 922. In an aspect, the gNB 902 may transmit the $\Delta f_k$ and $\theta_k$ as part of an RRC message (e.g., System Information Block, SIB) or a Non-Access Stratum (NAS) message. In an aspect, the gNB 902 may transmit $\Delta f_k$ and $\theta_k$ corresponding to multiple PTP clock instances 906 via the same message.

Since the UE's NR clock 912 (CLK_NR_UE) is synchronized with the gNB's NR clock 908 (CLK_NR_NB), the same $\Delta f_k$ and $\theta_k$ values apply for the same kth PTP clock instance 910 at the UE with respect to the UE's NR clock 912, and the UE may derive the same PTP clock based on the UE's NR clock 912 and the $\Delta f_k$ and $\theta_k$ values. In an aspect, UE calibrates a kth PTP clock instance 910 based on the UEs NR clock (CLK_NR_UE) and received $\Delta f_k$ and $\theta_k$ values for the corresponding kth PTP clock instance 906.

In certain aspects, another technique for synchronizing frequency between the gNB's PTP clock 906 and the UE's PTP clock 910 is by deriving the $\Delta f_k$ at the UE 904 based on time stamps associated with messages received from the gNB 902.

Figure 10:
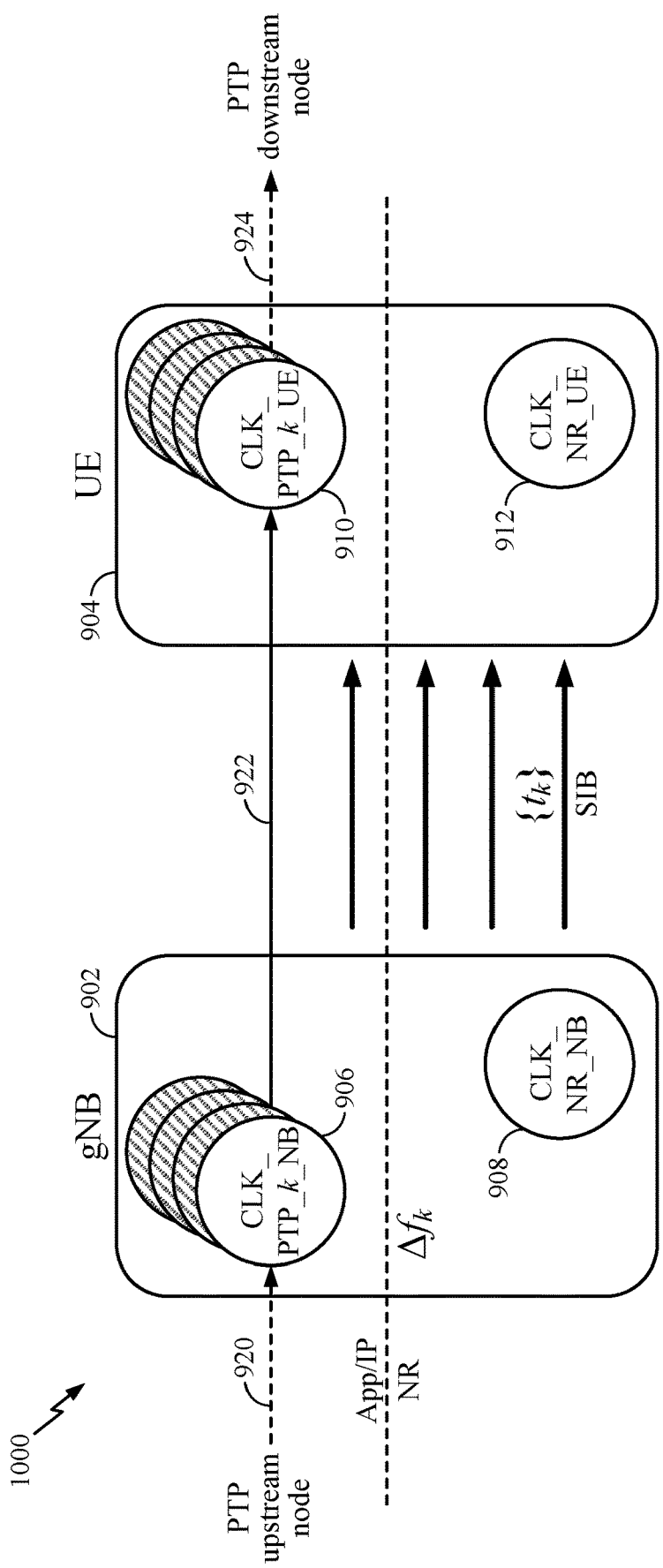
FIG. 10 illustrates an example of PTP clock synchronization over a 5G NR wireless connection using message time stamps, in accordance with certain aspects of the present disclosure.

FIG. 10 illustrates an example 1000 of PTP clock synchronization over a 5G NR wireless connection using message time stamps, in accordance with certain aspects of the present disclosure. The setup shown in FIG. 10 is similar to the setup of FIG. 9 with like elements identified by like reference numerals.

For the purpose of example 1000, it is assumed that phase shifts between the NR clocks and PTP clock instances at the gNB 902 and the UE 904 is not a factor or is negligible. Example 1000 is directed to synchronizing the frequency of corresponding PTP clocks 906 and 910.

In example 1000, the gNB periodically transmits to the UE a message. In an aspect, the message may be an RRC message (e.g., SIB) or a NAS message. The gNB also transmits a time stamp associated with each periodically transmitted instance of the message indicating a time at which the message instance was generated at the gNB in accordance with a PTP clock instance 906. In an aspect, the gNB transmits a separate time stamp based on each kth PTP clock 906. That is the gNB 902 transmits a time stamp tk of a message instance based on a kth PTP clock 906 (CLK_PTP_k_NB). Thus, multiple time stamps tk may be associated with the same message instance, each time stamp tk based on a different kth PTP clock 906. In an aspect, multiple time stamps of a message instance (e.g., w.r.t. different PTP clocks 906) may be conveyed to the UE in the same message instance.

In an aspect, the gNB 902 transmits a time stamp tk of a well-defined reference time instance of a message. For example, the reference time instance of a message (e.g., RRC/NAS message) may be at the end of a radio frame, slot or mini-slot or a current or previous instance of the message transmitted by the gNB 902.

In an aspect, the UE 904, for each kth PTP clock 910 corresponding to a kth clock 906, determines a first duration between receive times of two successively received message instances according to the UE NR clock 912. Since the NR clock 912 is synchronized with the NR clock 908, the first duration is same as a duration between transmit times of the message instances at the gNB 902. For the kth PTP clock 910, the UE 904 also determines a second duration between time stamps of two successive message instances received at the UE 904, wherein the time stamps are based on a corresponding kth PTP clock 906 at the gNB 902.

The UE determines a frequency offset $\Delta f$ between the gNB's NR clock 908 with respect to the gNB's kth PTP clock 906, based on comparing the determined first duration between the received message instances and the second duration between the received time stamps. Since the NR clock 912 is synchronized with the NR clock 908, the determined $\Delta f$ may be assumed as the $\Delta f$ between the UE's NR clock 912 and the UE's kth PTP clock 910.

The UE calibrates the kth PTP clock 910 based on the determined $\Delta f$.

Figure 11:
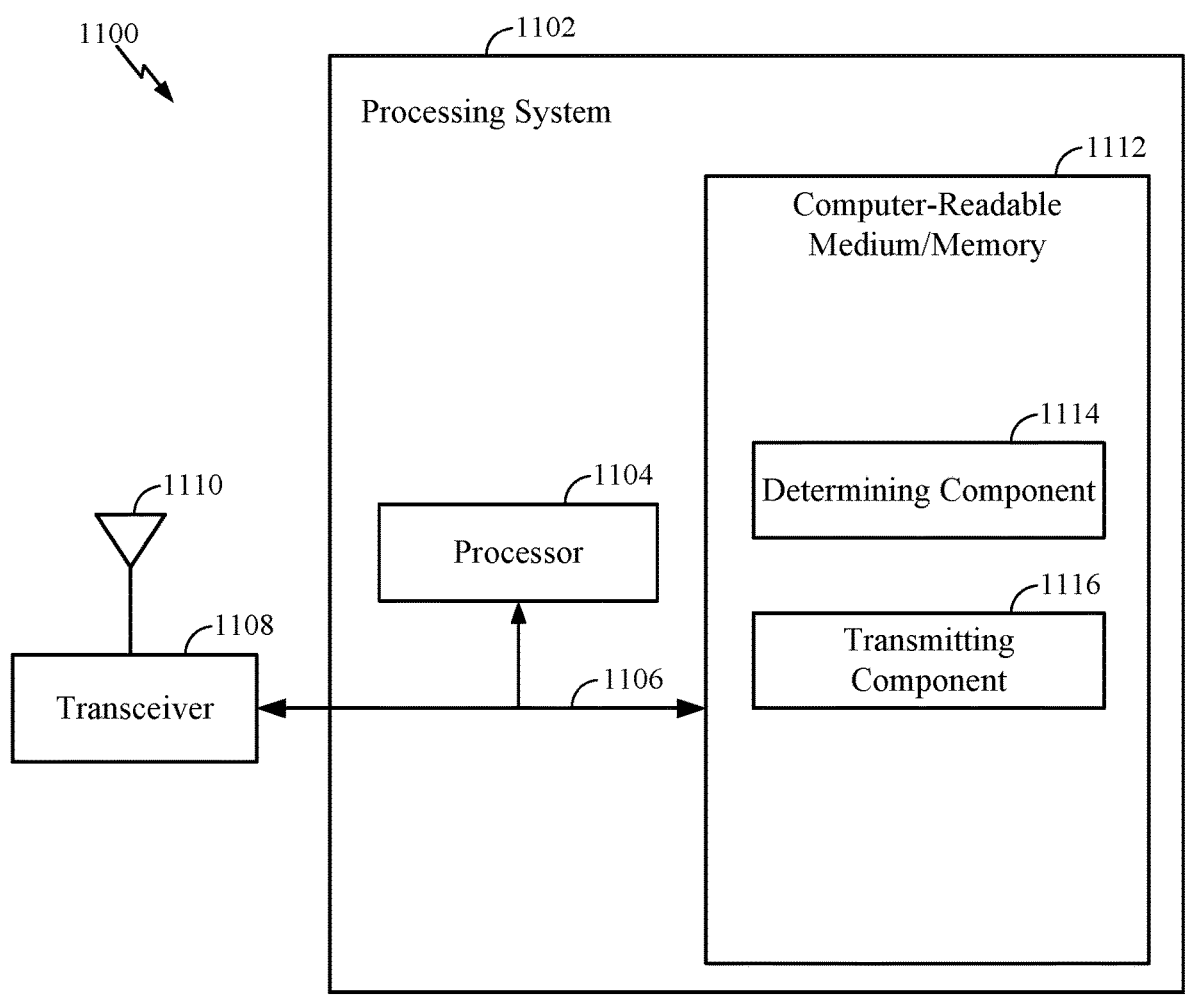
FIG. 11 illustrates a communications device that may include various components (e.g., corresponding to means-plus-function components) configured to perform operations for the techniques disclosed herein, such as the operations illustrated in FIG. 7.

FIG. 11 illustrates a communications device 1100 that may include various components (e.g., corresponding to means-plus-function components) configured to perform operations for the techniques disclosed herein, such as the operations illustrated in FIG. 7. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIG. 7, or other operations for performing the various techniques discussed herein.

In certain aspects, the processing system 1102 further includes a determining component 1114 for performing the determining operation illustrated in FIG. 7. Additionally, the processing system 1102 includes a transmitting component 1116 for performing the transmitting operation illustrated in FIG. 7. The determining component 1114 and transmitting component 1116 may be coupled to the processor 1104 via bus 1106. In certain aspects, the determining component 1114 and transmitting component 1116 may be hardware circuits. In certain aspects, the determining component 1114 and transmitting component 1116 may be software components that are executed and run on processor 1104.

Figure 12:
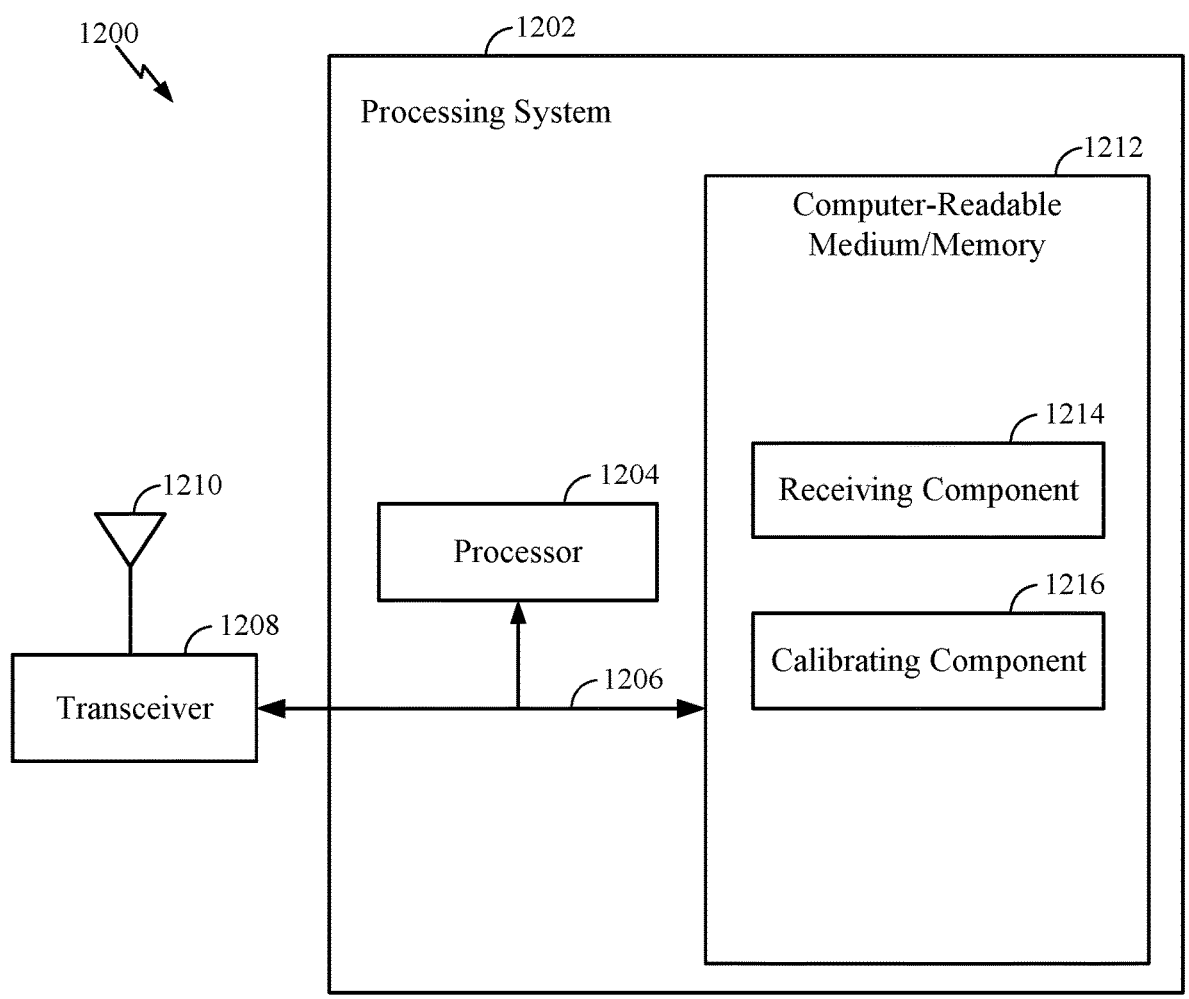
FIG. 12 illustrates a communications device that may include various components (e.g., corresponding to means-plus-function components) configured to perform operations for the techniques disclosed herein, such as the operations illustrated in FIG. 8.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIG. 8, or other operations for performing the various techniques discussed herein.

In certain aspects, the processing system 1202 further includes a receiving component 1214 for performing the receiving operation illustrated in FIG. 8. Additionally, the processing system 1202 includes a calibrating component 1216 for performing the calibrating operation illustrated in FIG. 8. The receiving component 1214 and calibrating component 1216 may be coupled to the processor 1204 via bus 1206. In certain aspects, the receiving component 1214 and calibrating component 1216 may be hardware circuits. In certain aspects, the receiving component 1214 and calibrating component 1216 may be software components that are executed and run on processor 1204.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first wireless node comprising:
   determining at least one offset, associated with at least one parameter, between each of at least one first clock used by the first wireless node for a first wired connection between the first wireless node and at least one upstream node and a second clock used by the first wireless node for a wireless connection between the first wireless node and a second wireless node on the downstream; and
   transmitting an indication of the determined at least one offset to the second wireless node for use by the second wireless node to calibrate at least one third clock corresponding to the at least one first clock to synchronize the at least one third clock with the at least one first clock, wherein the at least one third clock is used by the second wireless node for a second wired connection with at least one downstream node.

2. The method of claim 1, wherein the second clock is synchronized with a fourth clock of the second wireless node, wherein the fourth clock is used for the wireless connection between the first wireless node and the second wireless node.

3. The method of claim 1, wherein the at least one parameter comprises at least one of frequency or phase.

4. The method of claim 1, wherein the at least one parameter comprises frequency and phase, and wherein determining the at least one offset comprises measuring a frequency offset and a phase offset between each of the at least one first clock and the second clock.

5. The method of claim 4, wherein transmitting the indication of the determined at least one offset comprises transmitting the measured frequency offset and the measured phase offset corresponding to each of the at least one first clock.

6. The method of claim 4, wherein the transmitting comprises transmitting the measured frequency offset and the measured phase offset corresponding to each of the at least one first clock in a same message.

7. The method of claim 1, wherein the transmitting the indication comprises transmitting the determined at least one offset via at least one of a Radio Resource Control (RRC) message or a Non-Access Stratum (NAS) message.

8. The method of claim 1, wherein the at least one parameter comprises frequency, and wherein determining the at least one offset comprises measuring a frequency offset between each of the at least one first clock and the second clock.

9. The method of claim 8, wherein transmitting the indication of the determined at least one offset comprises, for each of the at least first clock:
periodically transmitting a message to the second wireless node; and
transmitting a time stamp associated with each periodically transmitted instance of the message, wherein the time stamp indicates a time at which the message was generated according to the at least one first clock.

10. The method of claim 9, wherein the time stamp is associated with a defined reference time instance in the message.

11. The method of claim 10, wherein the defined reference time instance comprises an end of at least one of a frame, a slot or a mini-slot of a current or previous transmitted instance of the message.

12. The method of claim 9, wherein the message comprises at least one of a System Information Block (SIB) message, another Radio Resource Control (RRC) message or a Non-Access Stratum (NAS) message.

13. The method of claim 1, wherein the first wired connection and the second wired connection use a point to point (PTP) protocol.

14. The method of claim 1, wherein the wireless connection uses $5^{th}$ Generation (5G) New Radio (NR).

15. A method for wireless communication by a first wireless node comprising:
receiving an indication of at least one offset from a second wireless node on the upstream, the at least one offset, associated with at least one parameter, is between each of at least one first clock used by the second wireless node for a first wired connection between the second wireless node and at least one upstream node and a second clock used by the second wireless node for a wireless connection between the second wireless node and the first wireless node; and
calibrating at least one third clock corresponding to the at least one first clock, based on the received indication, to synchronize the at least one third clock with the at least one first clock, wherein the at least one third clock is used by the first wireless node for a second wired connection with at least one downstream node.

16. The method of claim 15, wherein the second clock is synchronized with a fourth clock of the first wireless node, wherein the fourth clock is used for the wireless connection between the first wireless node and the second wireless node.

17. The method of claim 15, wherein the at least one parameter comprises at least one of frequency or phase.

18. The method of claim 15, wherein the at least one parameter comprises frequency and phase, and wherein receiving the indication of the at least one offset comprises receiving a frequency offset and a phase offset between each of the at least one first clock and the second clock.

19. The method of claim 18, wherein receiving the indication of the at least one offset comprises receiving the frequency offset and the phase offset in a same message.

20. The method of claim 18, wherein calibrating the at least one third clock comprises calibrating each of the at least one third clock based on the received frequency offset and the phase offset associated with a corresponding one of the at least one first clock.

21. The method of claim 15, wherein receiving the indication comprises receiving the at least one offset via at least one of a Radio Resource Control (RRC) message or a Non-Access Stratum (NAS) message.

22. The method of claim 15, wherein the at least one parameter comprises frequency, and wherein receiving the indication of the at least one offset comprises receiving a frequency offset between each of the at least one first clock and the second clock.

23. The method of claim 22, wherein receiving the indication of the at least one offset comprises, for each of the at least first clock:
periodically receiving a message from the second wireless node; and
receiving a time stamp associated with each periodically received instance of the message, wherein the time stamp indicates a time at which the message was generated at the second wireless node according to the at least one first clock.

24. The method of claim 23, wherein calibrating the at least one third clock comprises, for each corresponding one of the at least one third clock:
determining a first duration between two successively received messages based on a fourth clock of the first wireless node, wherein the fourth clock is used for the wireless connection between the first wireless node and the second wireless node;
determining a second duration between time stamps of two successively received messages; and
determining a frequency offset between the fourth clock and the third clock based on the first and second durations.

25. The method of claim 23, wherein the time stamp is associated with a defined reference time instance in the message.

26. The method of claim 25, wherein the defined reference time instance comprises an end of at least one of a frame, a slot or a mini-slot of a current or previous received instance of the message.

27. The method of claim 15, wherein the first wired connection and the second wired connection use a point to point (PTP) protocol.

28. The method of claim 15, wherein the wireless connection uses $5^{th}$ Generation (5G) New Radio (NR).

29. A first wireless node comprising:
at least one processor configured to:
determine at least one offset, associated with at least one parameter, between each of at least one first clock used by the first wireless node for a first wired connection between the first wireless node and at least one upstream node and a second clock used by the first wireless node for a wireless connection between the first wireless node and a second wireless node on the downstream; and
transmit an indication of the determined at least one offset to the second wireless node for use by the second wireless node to calibrate at least one third clock corresponding to the at least one first clock to synchronize the at least one third clock with the at least one first clock, wherein the at least one third clock is used by the second wireless node for a second wired connection with at least one downstream node; and
a memory coupled to the at least one processor.

30. The first wireless node of claim 29, wherein the second clock is synchronized with a fourth clock of the second wireless node, wherein the fourth clock is used for the wireless connection between the first wireless node and the second wireless node.

31. The first wireless node of claim 29, wherein the at least one parameter comprises at least one of frequency or phase.

32. The first wireless node of claim 29, wherein the at least one parameter comprises frequency, and wherein the at least one processor is configured to measure a frequency offset between each of the at least one first clock and the second clock.

33. The first wireless node of claim 32, wherein the at least one processor is configured to, for each of the at least first clock:
  periodically transmit a message to the second wireless node; and
  transmit a time stamp associated with each periodically transmitted instance of the message, wherein the time stamp indicates a time at which the message was generated according to the at least one first clock.

34. A first wireless node comprising:
  at least one processor configured to:
    receive an indication of at least one offset from a second wireless node on the upstream, the at least one offset, associated with at least one parameter, is between each of at least one first clock used by the second wireless node for a first wired connection between the second wireless node and at least one upstream node and a second clock used by the second wireless node for a wireless connection between the second wireless node and the first wireless node; and
    calibrate at least one third clock corresponding to the at least one first clock, based on the received indication, to synchronize the at least one third clock with the at least one first clock, wherein the at least one third clock is used by the first wireless node for a second wired connection with at least one downstream node; and
  a memory coupled to the at least one processor.

35. The first wireless node of claim 34, wherein the second clock is synchronized with a fourth clock of the first wireless node, wherein the fourth clock is used for the wireless connection between the first wireless node and the second wireless node.

36. The first wireless node of claim 34, wherein the at least one parameter comprises at least one of frequency or phase.

37. The first wireless node of claim 34, wherein the at least one parameter comprises frequency, and wherein the at least one processor is configured to receive a frequency offset between each of the at least one first clock and the second clock.

38. The first wireless node of claim 37, wherein the at least one processor is configured to, for each of the at least first clock:
  periodically receive a message from the second wireless node; and
  receive a time stamp associated with each periodically received instance of the message, wherein the time stamp indicates a time at which the message was generated at the second wireless node according to the at least one first clock.

* * * * *